United States Patent
Jasselin et al.

(10) Patent No.: US 12,331,198 B2
(45) Date of Patent: Jun. 17, 2025

(54) RUBBER COMPOSITIONS COMPRISING AN EPOXIDE DIENE ELASTOMER AND A CROSS-LINKING SYSTEM

(71) Applicant: COMPAGNIE GENERALE DES ETABLISSEMENTS MICHELIN, Clermont-Ferrand (FR)

(72) Inventors: Adeline Jasselin, Clermont-Ferrand (FR); Francois Jean-Baptiste-Dit-Dominique, Clermont-Ferrand (FR); Camille Chatard, Castries (FR); Cedric Loubat, Castries (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 217 days.

(21) Appl. No.: 17/767,841

(22) PCT Filed: Oct. 8, 2020

(86) PCT No.: PCT/FR2020/051773
§ 371 (c)(1),
(2) Date: Apr. 8, 2022

(87) PCT Pub. No.: WO2021/069840
PCT Pub. Date: Apr. 15, 2021

(65) Prior Publication Data
US 2024/0101797 A1    Mar. 28, 2024

(30) Foreign Application Priority Data
Oct. 10, 2019   (FR) ..................................... 1911279

(51) Int. Cl.
*C08L 9/06* (2006.01)
*B60C 1/00* (2006.01)
*C08K 3/36* (2006.01)
*C08K 5/5357* (2006.01)

(52) U.S. Cl.
CPC .................. *C08L 9/06* (2013.01); *B60C 1/00* (2013.01); *C08K 3/36* (2013.01); *C08K 5/5357* (2013.01); *C08L 2312/00* (2013.01)

(58) Field of Classification Search
CPC .......... C08L 9/06; C08L 2312/00; B60C 1/00; C08K 3/36; C08K 5/5357
See application file for complete search history.

(56) References Cited

U.S. PATENT DOCUMENTS

| | | | |
|---|---|---|---|
| 6,140,393 | A | 10/2000 | Bomal et al. |
| 6,774,255 | B1 | 8/2004 | Tardivat et al. |
| 10,030,116 | B2 | 7/2018 | Salit et al. |
| 10,544,292 | B2 | 1/2020 | Doisneau et al. |
| 11,572,458 | B2 | 2/2023 | Thuilliez et al. |
| 2003/0212185 | A1 | 11/2003 | Vasseur |
| 2004/0051210 | A1 | 3/2004 | Tardivat et al. |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2006/0199917 | A1 | 9/2006 | Chino |
| 2008/0132644 | A1 | 6/2008 | Lapra et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0270558 | A1 | 10/2009 | Gandon-Pain et al. |
| 2009/0292063 | A1 | 11/2009 | Robert et al. |
| 2009/0297827 | A1 | 12/2009 | Lapra et al. |
| 2010/0022714 | A1 | 1/2010 | Varagniat et al. |
| 2011/0009547 | A1 | 1/2011 | Araujo Da Silva et al. |

(Continued)

FOREIGN PATENT DOCUMENTS

| | | |
|---|---|---|
| CN | 108624062 A | 10/2018 |
| EP | 0763564 A2 | 3/1997 |

(Continued)

OTHER PUBLICATIONS

International Search Report dated Nov. 26, 2020, in corresponding PCT/FR2020/051773 (5 pages).

N. Belkhouche, et al., "Study of New Organophosphorus Derivates Carriers on the Selective Recovery of M (II) and M (III) Metals, Using Supported Liquid Membrane Extraction", Journal of Membrane Science, vol. 284, pp. 398-405 (2006).

(Continued)

*Primary Examiner* — John E Uselding
(74) *Attorney, Agent, or Firm* — VENABLE LLP

(57) ABSTRACT

A rubber composition contains: an elastomer matrix comprising at least one diene elastomer comprising epoxide functions, at least one reinforcing filler, and a system for crosslinking the polymer, comprising at least one organopolyphosphorus compound of general formula (I)

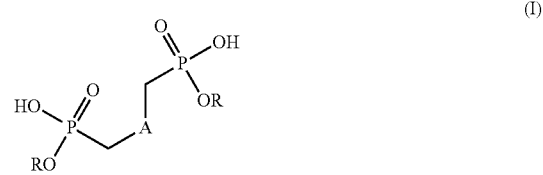

in which A represents a covalent bond or a hydrocarbon group comprising at least 1 carbon atom, which is optionally substituted and which optionally comprises one or more heteroatoms, and the Rs represent, independently of one another, a hydrocarbon group comprising at least 1 carbon atom or a hydrogen atom.

11 Claims, No Drawings

(56) References Cited

U.S. PATENT DOCUMENTS

| | | |
|---|---|---|
| 2011/0021702 A1 | 1/2011 | Gandon-Pain et al. |
| 2015/0299435 A1 | 10/2015 | Fleury et al. |
| 2015/0322234 A1 | 11/2015 | Fleury et al. |
| 2015/0337109 A1 | 11/2015 | Fleury et al. |
| 2015/0368444 A1 | 12/2015 | Fleury et al. |
| 2017/0166010 A1 | 6/2017 | Michoud et al. |
| 2018/0009972 A1 | 1/2018 | Doisneau et al. |
| 2018/0326786 A1 | 11/2018 | Thuilliez et al. |
| 2018/0371141 A1 | 12/2018 | Thuilliez et al. |
| 2021/0087366 A1 | 3/2021 | Thuilliez et al. |
| 2021/0380784 A1 | 12/2021 | Thuilliez et al. |
| 2023/0077022 A1 | 3/2023 | Thuilliez et al. |
| 2024/0174024 A1 | 5/2024 | Thuilliez et al. |

FOREIGN PATENT DOCUMENTS

| | | | |
|---|---|---|---|
| EP | 0784072 A1 | 7/1997 | |
| EP | 1403287 A1 | 3/2004 | |
| FR | 2999586 A1 | 6/2014 | |
| FR | 3031746 A1 | 7/2016 | |
| FR | 3043591 A1 | 5/2017 | |
| JP | 2007-269658 A | 10/2007 | |
| JP | 2012-211122 A | 11/2012 | |
| WO | 97/36724 A2 | 10/1997 | |
| WO | 99/16600 A1 | 4/1999 | |
| WO | 02/10269 A2 | 2/2002 | |
| WO | 02/30939 A1 | 4/2002 | |
| WO | 02/31041 A1 | 4/2002 | |
| WO | 02/083782 A1 | 10/2002 | |
| WO | 03/002648 A1 | 1/2003 | |
| WO | 03/002649 A1 | 1/2003 | |
| WO | 03/016387 A1 | 2/2003 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2007/003408 A1 | 1/2007 | |
| WO | 2007/017060 A1 | 2/2007 | |
| WO | 2008/003434 A1 | 1/2008 | |
| WO | 2008/003435 A1 | 1/2008 | |
| WO | 2009/062733 A2 | 5/2009 | |
| WO | 2014/095582 A1 | 6/2014 | |
| WO | 2014/095583 A1 | 6/2014 | |
| WO | 2014/095585 A1 | 6/2014 | |
| WO | 2014/095586 A1 | 6/2014 | |
| WO | 2017/081387 A1 | 5/2017 | |
| WO | 2017/081388 A1 | 5/2017 | |
| WO | WO-2019122587 A1 * | 6/2019 | ............ B60C 1/00 |

OTHER PUBLICATIONS

Y. Li, et al., "Molecular Structures of the Products of a Diphosphonate Ester Building Block with Lewis Bases", Molecules 2015, 20, 14435-14450.

M.R. Gimmett, "Product Class 3: Imidazoles", Science of Synthesis, 2002, 12.3, 325-528.

Y. Chang, et al., "Thermomechanical properties and shape memory effect of epoxidized natural rubber crosslinked by 3-amino-1,2,4-triazole", Polym Int 56: 694-698 (2007).

* cited by examiner

RUBBER COMPOSITIONS COMPRISING AN EPOXIDE DIENE ELASTOMER AND A CROSS-LINKING SYSTEM

TECHNICAL FIELD

The present invention relates to diene rubber compositions, in particular to diene rubber compositions comprising a crosslinking system other than a vulcanization system.

PRIOR ART

It is known, and has been normal for many years, to use, in tires, rubber compositions having an elastomer matrix which is crosslinked with sulfur; this crosslinking is then known as vulcanization. The conventional vulcanization system combines sulfur and at least one vulcanization accelerator. However, it is also known that such a system is damaging to the processing of the composition before curing by the scorching phenomenon. It will be recalled that the "scorching" phenomenon rapidly results, during the preparation of the rubber compositions, in premature vulcanizations ("scorching"), in very high viscosities in the raw state, and finally in rubber compositions which are virtually impossible to work and to process industrially.

Consequently, the vulcanization systems have been improved over the years, in combination with the processes for the preparation of the rubber compositions, in order to overcome the abovementioned disadvantages. Thus, the compositions are often complex and comprise, in addition to the sulfur or an agent which donates sulfur, vulcanization accelerators, activators and optionally vulcanization retardants.

With a view to simplifying the compositions and the preparation thereof, the applicant has in the past proposed rubber compositions comprising crosslinking systems that are as effective as conventional vulcanization systems. Thus, for example, documents WO2014095582, WO2014095583, WO2014095585 and WO2014095586 describe rubber compositions for tires based on at least one polymer comprising epoxide functions, on a system for crosslinking said polymer comprising a dicarboxylic acid and on an imidazole compound. The polymer comprising epoxide functions is a diene elastomer forming the elastomer matrix. These compositions have the double advantage of a simplified preparation compared with conventional compositions comprising a vulcanization system, and of improved hysteresis properties.

It is still necessary to improve the properties of the rubber compositions which are used in the manufacture of tires in order to improve the performance of the latter. In particular, improving the extensometry properties of rubber compositions used in the manufacture of tires makes it possible to improve certain properties of the latter, such as, for example, high-strain endurance. The service life of the tire can thus be improved.

The objectives set by the inventors are to have rubber compositions which can be used for tire manufacture, which are simple to prepare and which have good extensometry properties, in particular improved extensometry properties compared to compositions comprising a crosslinking system based on a dicarboxylic acid.

DISCLOSURE OF THE INVENTION

Pursuing their research, the inventors have now developed specific rubber compositions which can be used for the manufacture of tires, which can be prepared in a simplified manner compared to compositions comprising a vulcanization system, and which can have improved extensometry properties compared to compositions comprising a cross-linking system based on a dicarboxylic acid.

SUMMARY OF THE INVENTION

Consequently, a first subject of the invention relates to a rubber composition containing
- an elastomer matrix comprising at least one diene elastomer comprising epoxide functions,
- at least one reinforcing filler, and
- a system for crosslinking said polymer, comprising at least one organopolyphosphorus compound of general formula (I)

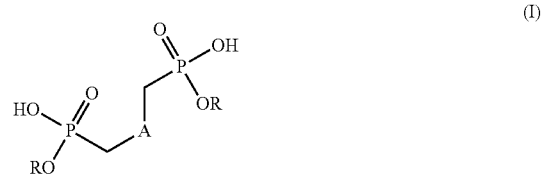

in which:
A represents a covalent bond or a hydrocarbon group comprising at least 1 carbon atom, which is optionally substituted and which optionally comprises one or more heteroatoms, and
the R represent, independently of one another, a hydrocarbon group comprising at least 1 carbon atom or a hydrogen atom.

Preferentially, a subject of the invention is a rubber composition as defined above in which A represents a covalent bond or a divalent hydrocarbon group comprising at least 1, preferably at least 2, more preferentially at least 4, and at most 1800 carbon atoms, preferably at most 300 carbon atoms, more preferentially at most 100 carbon atoms.

Also preferentially, a subject of the invention is a rubber composition as defined above in which A is a divalent hydrocarbon group of aliphatic type or a divalent hydrocarbon group of aromatic type or a divalent group comprising at least one aliphatic part and one aromatic part. Preferably, A is a divalent group of aliphatic type or a divalent group comprising at least one aliphatic part and one aromatic part.

Preferably, a subject of the invention is a rubber composition as defined above in which A is a hydrocarbon group comprising at least 1 carbon atom and comprising at least one heteroatom selected from oxygen, nitrogen and sulfur, preferably oxygen.

In particular, a subject of the invention is a rubber composition as defined above in which A is a divalent group of aliphatic type or a divalent group comprising at least one aliphatic part and one aromatic part, which group optionally comprises at least one oxygen atom.

Preferentially, a subject of the invention is a rubber composition as defined above in which the R represent, independently of one another, a hydrogen atom or an alkyl group having from 1 to 20 carbon atoms, preferably 1 to 12 carbon atoms, a cycloalkyl group having from 5 to 24 carbon atoms, an aryl group having from 6 to 30 carbon atoms or an aralkyl group having from 7 to 25 carbon atoms.

Preferably again, a subject of the invention is a rubber composition as defined above in which the R are identical.

More preferentially, the R are identical and represent a hydrogen atom or an alkyl group having from 1 to 12 carbon atoms.

Preferably, a subject of the invention is a rubber composition as defined above in which the content of organopolyphosphorus compounds is at least 0.2 phr and at most 20 phr, preferably within a range extending from 0.2 phr to 10 phr.

Preferably, a subject of the invention is a rubber composition as defined above in which the reinforcing filler comprises carbon black, silica or a mixture of carbon black and silica. Preferentially, a subject of the invention is a rubber composition as defined above in which the content of reinforcing filler is between 20 and 180 phr.

A further subject of the invention is a tire comprising a rubber composition as defined above. The tires in accordance with the invention are in particular intended for motor vehicles.

A subject of the invention is also an organopolyphosphorus compound of formula (II)

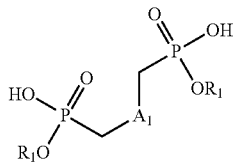

(II)

in which:
the $R_1$s represent, independently of one another, a hydrocarbon group comprising at least 1 carbon atom or a hydrogen atom, and
A1 represents a divalent hydrocarbon group mainly composed of units of type (IIa), —(O—R')$_n$— (IIa)

in which R' represents a divalent hydrocarbon group comprising at least 1 carbon atom and n represents an integer greater than or equal to 2.

Preferably, the organopolyphosphorus compound of formula (II) is characterized in that, in formula (IIa), R' is a polymethylene group of formula —(CH$_2$)$_m$—, m representing an integer greater than or equal to 2, preferably at most 10, more preferentially from 2 to 5, and n represents an integer of at most 20.

Even more preferably, the organopolyphosphorus compound of formula (II) corresponds more particularly to general formula (IIb):

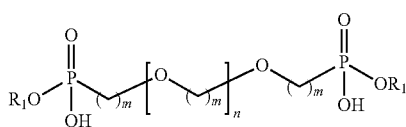

(IIb)

m representing an integer greater than or equal to 2 and at most 10, preferentially from 2 to 5, and n representing an integer of at most 20, the $R_1$s being as described above.

The invention and its advantages will be easily understood in the light of the description and implementational examples which follow.

DETAILED DESCRIPTION

I. Rubber Composition of the Invention

The rubber composition according to the invention contains at least
an elastomer matrix comprising at least one diene elastomer comprising epoxide functions,
a reinforcing filler, and
a system for crosslinking said elastomer, comprising an organopolyphosphorus compound of general formula (I)

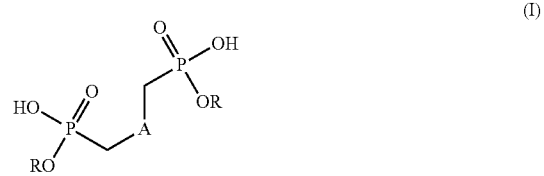

(I)

in which:
A represents a covalent bond or a hydrocarbon group comprising at least 1 carbon atom, which is optionally substituted and which optionally comprises one or more heteroatoms, and
the R represent, independently of one another, a hydrocarbon group comprising at least 1 carbon atom or a hydrogen atom.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant for the purposes of the present invention and, in a system comprising two polymers, the predominant polymer represents more than half of the weight of the polymers.

On the contrary, a "minor" compound is a compound which does not represent the greatest fraction by weight among the compounds of the same type.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

The compounds mentioned in the description can be of fossil origin or be biobased. In the latter case, they may be partially or completely derived from biomass or be obtained from renewable starting materials derived from biomass. Polymers, plasticizers, fillers and the like are concerned in particular.

When reference is made to a "phosphonic" function, this is intended to mean, for the purposes of the present invention, the "phosphonic acid" function and the "phosphonic acid hemiester" function.

For the purposes of the present invention, the term "phosphonic acid" function is intended to mean a function which corresponds to the formula:

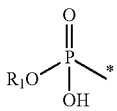

$R_1$=H and —* representing the bond to the rest of the molecule bearing the phosphonic function.

For the purposes of the present invention, the term "phosphonic acid hemiester" function is intended to mean a function which corresponds to the formula:

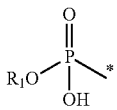

$R_1$=alkyl and —* representing the bond to the rest of the molecule bearing the phosphonic function.

I.1. Diene Elastomer Comprising Epoxide Functions (or Epoxidized Elastomer)

When reference is made to an epoxidized diene elastomer or rubber (the two terms being in a known way synonymous and interchangeable) or elastomer or rubber comprising epoxide functions, it is recalled that what is intended in the broad sense is a synthetic or natural elastomer, which is functionalized, that is to say that it bears epoxide functional groups, whether these are pendent along the elastomer chain or in the elastomer chain, including the chain ends.

It is preferable to use at least one diene elastomer from the group consisting of natural rubber (NR), synthetic polyisoprenes (IRs), polybutadienes (BRs), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRS), isoprene/butadiene/styrene copolymers (SBIRs) and mixtures of such copolymers.

The above diene elastomers may be, for example, block, random, sequential or microsequential elastomers and may be prepared in dispersion or in solution; they may be coupled and/or star-branched or else functionalized with a coupling and/or star-branching or functionalization agent.

Such epoxidized diene elastomers and their processes of preparation are well known to those skilled in the art and are commercially available. Diene elastomers bearing epoxide groups have been described for example in EP 0763564 A1 or EP 1403287 A1.

Epoxidized natural rubbers (abbreviated to "ENRs"), for example, can be obtained in a known way by epoxidation of natural rubber, for example by processes based on chlorohydrin or on bromohydrin or processes based on hydrogen peroxide, on alkyl hydroperoxides or on peracids (such as peracetic acid or performic acid); such ENRs are, for example, sold under the names "ENR-25" and "ENR-50" (respective degrees of epoxidation of 25% and 50%) by Guthrie Polymer. Epoxidized BRs are, themselves also, well known, for example sold by Cray Valley under the name Poly Bd (for example, Poly Bd 605E). Epoxidized SBRs may be prepared by epoxidation techniques that are well known to those skilled in the art.

Preferentially, the epoxidized diene elastomer is selected from the group consisting of epoxidized natural rubbers (NRs) (abbreviated as ENRs), epoxidized synthetic polyisoprenes (IRs), epoxidized polybutadienes (BRs), epoxidized butadiene-styrene copolymers (SBRs) and mixtures of these elastomers. More preferably, the epoxidized diene elastomer is selected from the group consisting of epoxidized butadiene polymers and mixtures thereof, particularly the epoxidized diene elastomer is an epoxidized styrene-butadiene copolymer (SBR).

The degree (molar %) of epoxidation of the epoxidized diene elastomers described above can vary to a large extent according to the particular embodiments of the invention, preferably at least 0.2%, more preferentially at least 2%, and preferably at most 60%, more preferably at most 50%, even more preferably at most 20%. When the degree of epoxidation is less than 0.2%, there is a risk of the targeted technical effect being insufficient whereas, above 60%, there is a risk of the elastomer being denatured. For all these reasons, the degree of functionalization, in particular of epoxidation, is more preferably within a range from 2% to 20%.

The rubber compositions of the invention can comprise just one epoxidized diene elastomer or a mixture of several epoxidized diene elastomers (which will then be noted in the singular as being "the epoxidized diene elastomer" in order to represent the sum of the epoxidized elastomers of the composition).

Preferentially, the rubber composition of the invention is devoid of non-epoxidized diene elastomer. In other words, the epoxidized diene elastomer, in the broad sense of the sum of the epoxidized diene elastomers, is preferentially the only diene elastomer in the rubber composition of the invention.

I.2. Reinforcing Filler

Use may be made of any type of reinforcing filler known for its abilities to reinforce a rubber composition which can be used in the manufacture of tires, for example an organic filler such as carbon black, a reinforcing inorganic filler such as silica, or else a blend of these two types of filler, notably a blend of carbon black and silica.

All carbon blacks, notably blacks of the HAF, ISAF or SAF type, conventionally used in tires ("tire-grade" blacks) are suitable as carbon blacks. Among the latter, mention will be made more particularly of the reinforcing carbon blacks of the 100, 200 or 300 series (ASTM grades), for instance the N115, N134, N234, N326, N330, N339, N347 or N375 blacks, or else, depending on the applications targeted, blacks of higher series (for example N660, N683 or N772). The carbon blacks might, for example, be already incorporated into an isoprene elastomer in the form of a masterbatch (see, for example, applications WO 97/36724 and WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

"Reinforcing inorganic filler" should be understood, in the present application, by definition, as meaning any inorganic or mineral filler (whatever its color and its origin (natural or synthetic)), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state in which the reinforcing inorganic filler is provided is not important, whether it be in the form of a powder, of micropearls, of granules, of beads or any other appropriate densified form. Of course, "reinforcing inorganic filler" is also understood to mean mixtures of different reinforcing inorganic fillers, in particular of highly dispersible siliceous and/or aluminous fillers such as described hereinafter.

Mineral fillers of the siliceous type, in particular silica ($SiO_2$), or of the aluminous type, in particular alumina ($Al_2O_3$), are notably suitable for use as reinforcing inorganic fillers. The silica used may be any reinforcing silica known to those skilled in the art, especially any precipitated or fumed silica with a BET surface area and a CTAB specific surface area that are both less than 450 $m^2/g$, preferably from 30 to 400 $m^2/g$. As highly dispersible precipitated silicas (HDSs), mention will be made, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

The reinforcing inorganic filler used, in particular if it is silica, preferably has a BET surface area of between 45 and 400 $m^2/g$, more preferably of between 60 and 300 $m^2/g$.

Preferentially, the total content of reinforcing filler (carbon black and/or reinforcing inorganic filler such as silica) is between 20 and 200 phr, more preferentially between 30 and 150 phr, the optimum being, in a known manner, different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy-duty vehicle.

According to one preferential embodiment of the invention, use is made of a reinforcing filler comprising between 30 and 150 phr, more preferably between 50 and 120 phr, of inorganic filler, particularly of silica and optionally of carbon black; the carbon black, when it is present, is preferably used in a content of less then 20 phr, more preferably of less than 10 phr (for example between 0.1 and 10 phr).

In order to couple the reinforcing inorganic filler to the diene elastomer, use may be made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use may in particular be made of silane polysulfides, referred to as "symmetrical" or "asymmetrical" depending on their specific structure, such as described, for example, in applications WO 03/002648 (or US 2005/016651) and WO 03/002649 (or US 2005/016650).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulfides (in particular disulfides, trisulfides or tetrasulfides), more particularly bis(monoethoxydimethylsilylpropyl) tetrasulfide, such as described in patent application WO 02/083782 (or US 2004/132880).

Mention will in particular be made, as coupling agent other than alkoxysilane polysulfide, of bifunctional POSs (polyorganosiloxanes), or else of the hydroxysilane polysulfides as described in patent applications WO 02/30939 (or U.S. Pat. No. 6,774,255) and WO 02/31041 (or US 2004/051210), or else of silanes or POSs bearing azodicarbonyl functional groups, as described for example in patent applications WO 2006/125532, WO 2006/125533 and WO 2006/125534.

In the rubber compositions in accordance with the invention, the content of coupling agent is less than 20 phr. Typically, the content of coupling agent represents from 0.5% to 15% by weight, with respect to the amount of inorganic filler. In the rubber compositions in accordance with the invention, the content of coupling agent is preferentially between 3 and 12 phr.

Those skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, or else includes, at its surface, functional sites, in particular hydroxyl sites, requiring the use of a coupling agent in order to establish the bond between the filler and the elastomer.

I.3. System for Crosslinking the Epoxidized Polymer

The epoxidized diene elastomer and the reinforcing filler described above are combined with a crosslinking system capable of crosslinking the composition of the tire according to the invention. This crosslinking system comprises one (that is to say comprises at least one) organopolyphosphorus compound of general formula (I).

The organopolyphosphorus compound useful for the purposes of the invention is an organopolyphosphorus compound of general formula (I)

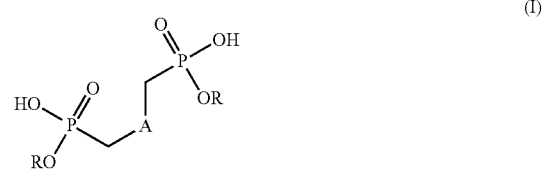

(I)

in which:
A represents a covalent bond or a hydrocarbon group comprising at least 1 carbon atom, which is optionally substituted and which optionally comprises one or more heteroatoms, and
the R represent, independently of one another, a hydrogen atom or an alkyl group comprising at least 1 carbon atom.

Preferentially, a subject of the invention is a rubber composition as defined above in which A represents a covalent bond or a divalent hydrocarbon group comprising at least 1, preferably at least 2, more preferentially at least 4 carbon atoms. Likewise preferably, when A represents a divalent hydrocarbon group, A represents a divalent hydrocarbon group comprising at most 1800 carbon atoms, preferably at most 300 carbon atoms, more preferentially at most 100 carbon atoms, even more preferentially at most 65 carbon atoms. Even more preferentially, A represents a covalent bond or a divalent hydrocarbon group comprising from 4 to 100 carbon atoms and preferably from 4 to 65 carbon atoms.

Likewise preferably, in the compound of general formula (I), A is a divalent hydrocarbon group of aliphatic or aromatic type or a divalent group comprising at least one aliphatic part and one aromatic part. Preferably, A is a divalent group of aliphatic type or a divalent group comprising at least one aliphatic part and one aromatic part.

In the compound of general formula (I), A may comprise at least one heteroatom selected from oxygen, nitrogen and sulfur, preferably oxygen.

Likewise, in the compound of general formula (I), A can be substituted with at least one radical selected from alkyl, cycloalkylalkyl, aryl, aralkyl, hydroxyl, alkoxy, amino (—NR"R'"T, R" and R'" being H or an alkyl radical) and carbonyl radicals. These radicals are defined as: alkyl having from 1 to 20 carbon atoms, preferably from 1 to 12 carbon atoms, cycloalkyl having from 5 to 24 carbon atoms, aryl having from 6 to 30 carbon atoms and aralkyl having from 7 to 25 carbon atoms.

According to a preferential embodiment, A does not comprise any other phosphoric function. The organopolyphosphorus compound is then an organobiphosphorus compound.

According to another preferential embodiment, in the compound of general formula (I), A is a divalent group of aliphatic type or a divalent group comprising at least one aliphatic part and one aromatic part, which group optionally comprises at least one oxygen atom. More preferentially, the compound of general formula (I) then does not comprise any other phosphonic function.

Preferentially, in the compound of general formula (I), the R represent, independently of one another, a hydrogen atom or an alkyl group having from 1 to 20 carbon atoms, preferably 1 to 12 carbon atoms, or a cycloalkyl group having from 5 to 24 carbon atoms, or else an aryl group having from 6 to 30 carbon atoms or an aralkyl group having from 7 to 25 carbon atoms.

Preferably again, a subject of the invention is a rubber composition as defined above in which the R are identical.

More preferentially, the R are identical and represent a hydrogen atom or an alkyl group having from 1 to 12 carbon atoms.

The content of organopolyphosphorus compound is preferentially at least 0.2 and at most 20 phr, preferably within a range extending from 0.2 to 10 phr. Below 0.2 phr of organopolyphosphorus compound, the effect of the crosslinking is not significant, whereas above 20 phr of organopolyphosphorus compound, the rubber-filler interaction may be penalized or else the stiffness of the composition may be reduced.

The organopolyphosphorus compounds useful for the purposes of the invention are either commercially available or are easily prepared by those skilled in the art according to well-known techniques such as the chemical processes described for example in the document Yufeng Li et al., Molecules 2015, 20, 14435-14450; doi:10.3390/molecules200814435.

For example, as organopolyphosphorus compounds useful for the purposes of the invention, mention may be made of phosphonic acid [1,4-phenylenebis(methylene)]bis-P,P'-diethyl ester (CAS No. 4546-05-8), phosphonic acid [1,1T-oxybisethyl]bis-P,P'-dihexyl ester (CAS No. 856638-06-7), or phosphonic acid [1,12 dodecanediyl]bis-P,P'-diethyl ester (CAS No. 1229230-54-9).

For example, as an organopolyphosphorus compound that is commercially available and useful for the purposes of the invention, mention may be made of: xylylenebiphosphonic acid from ABCR, or methylenebiphosphonic acid.

According to one embodiment of the invention, the system for crosslinking the rubber composition according to the invention may contain an imidazole. Such a compound is known to those skilled in the art and described in particular in documents WO2014095582, WO2014095583, WO2014095585 and WO2014095586.

According to this embodiment of the invention, the content of imidazole is preferentially within a range extending from 0.01 to 4 molar equivalents, and preferably from 0.01 to 3 molar equivalents, relative to the phosphonic functions present on the organopolyphosphorus compound of general formula (I).

The imidazoles that are useful for the purposes of the invention are either commercially available or are readily prepared by those skilled in the art according to well-known techniques, as described, for example, in JP2012211122 and JP2007269658 or in Science of Synthesis, 2002, 12, 325-528. For example, by way of imidazoles that are commercially available and useful for the purposes of the invention, mention may be made of 1,2-dimethylimidazole, 1-decyl-2-methylimidazole or 1-benzyl-2-methylimidazole.

A composition comprising an organopolyphosphorus compound of general formula (I) and an imidazole can be a composition in which said organopolyphosphorus compound and said imidazole have previously reacted together before their introduction into the composition.

According to another embodiment of the invention, the rubber composition according to the invention does not contain imidazole. According to this embodiment of the invention, it is surprisingly and unexpectedly possible to even further improve the extensometry properties of a rubber composition according to the invention compared to a composition according to the invention containing an imidazole. Thus, preferably, the compositions of the invention are devoid of imidazole, or contain less than 0.01 molar equivalents of imidazole, relative to the phosphonic functions present on the organopolyphosphorus compound of general formula (I).

I.4. Other Additives

The rubber compositions of the tires in accordance with the invention can also comprise all or a portion of the usual additives generally used in elastomer compositions intended for the manufacture of tires, such as, for example, pigments, protection agents, such as antiozonant waxes, chemical antiozonants or antioxidants, antifatigue agents, crosslinking agents other than those mentioned above, reinforcing resins or plasticizing agents. Preferably, this plasticizing agent is a solid hydrocarbon resin (or plasticizing resin), an extending oil (or plasticizing oil) or a mixture of the two.

These compositions may also contain, in addition to the coupling agents, coupling activators, agents for covering the inorganic fillers or more generally processing aids capable, in a known manner, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

Preferentially, the rubber compositions of the invention are free of a crosslinking system other than the one described above and which comprises an organopolyphosphorus compound. In other words, the crosslinking system based on at least one organopolyphosphorus compound is preferentially the only crosslinking system in the rubber composition of the invention. Preferably, the compositions of the invention are free of a vulcanization system, or contain less than 1 phr of sulfur, preferably less than 0.5 phr and more preferentially less than 0.2 phr. Likewise, the composition is preferentially devoid of any vulcanization accelerator as known to those skilled in the art or contains less than 1 phr, preferably less than 0.5 phr and more preferentially less than 0.2 phr thereof.

I.5. Preparation of the Rubber Compositions

The rubber compositions of the invention can be manufactured in appropriate mixers, using two successive phases of preparation well known to those skilled in the art: a first phase of thermomechanical working or kneading ("non-productive" phase) at high temperature, up to a maximum temperature of between 110° C. and 180° C., preferably between 130° C. and 160° C., followed by a second phase of mechanical working ("productive" phase) down to a lower temperature, typically of less than 110° C., for example between 40° C. and 100° C., during which finishing phase the crosslinking system may be incorporated.

The final composition thus obtained can subsequently be calendered, for example in the form of a sheet or a slab, especially for laboratory characterization, or else extruded, for example in order to form a rubber profiled element used in the manufacture of the tire of the invention.

The rubber composition according to the invention can be used in different parts of said tire, the latter also constituting a subject of the invention.

II. Organopolyphosphorus Compound

A subject of the invention is also an organopolyphosphorus compound of general formula (II)

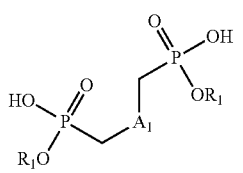

(II)

in which:

the $R_1$s represent, independently of one another, a hydrocarbon group comprising at least 1 carbon atom or a hydrogen atom, and $A_1$ represents a divalent hydrocarbon group mainly composed of units of type (IIa), $$—(O—R')_n—$$ (IIa)

in which R' represents a divalent hydrocarbon group comprising at least 1 carbon atom and n represents an integer greater than or equal to 2.

Preferentially, in the compound of general formula (II), the $R_1$s represent, independently of one another, a hydrogen atom or an alkyl group having from 1 to 20 carbon atoms, preferably 1 to 12 carbon atoms, or a cycloalkyl group having from 5 to 24 carbon atoms, or else an aryl group having from 6 to 30 carbon atoms or an aralkyl group having from 7 to 25 carbon atoms, preferably from 1 to 12 carbon atoms.

More preferentially, the $R_1$s are identical and represent a hydrogen atom or an alkyl group having from 1 to 12 carbon atoms.

Preferentially, in the compound of general formula (II), n represents an integer of at most 20.

Preferentially, in the compound of general formula (IIa), R' is an aliphatic hydrocarbon group, which is preferentially linear or branched, even more preferentially a polymethylene group of formula $—(CH_2)_m—$, m representing an integer greater than or equal to 2, preferably of at most 10, more preferentially ranging from 2 to 5.

Preferentially, the compound of general formula (II) corresponds to the general formula (IIb):

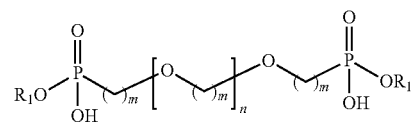

m representing an integer greater than or equal to 2 and of at most 10, preferably ranging from 2 to 5, and n representing an integer of at least 2 and at most 20, the $R_1$s being as defined above.

The preferential aspects of the compound of general formula (II) concerning the definitions of $R_1$, R', m and n can be combined with one another.

III. Examples

III.1. Synthesis Phosphonic Hemiester B

The phosphonic hemiester B is represented by the formula:

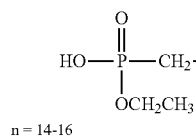

n = 14-16

The preparation of polyTHF bis-phosphonic acid monoethyl ester (phosphonic hemiester B) requires four synthesis steps:

1st step: Mesylation of polyTHF diol 1000 g/mol;
2nd step: Synthesis of dibrominated polyTHF by reaction of LiBr with polyTHF bis-mesylate;
3rd step: Synthesis of polyTHF diethyl phosphonate by Arbuzov reaction between dibrominated polyTHF and triethyl phosphite; and
4th step: PolyTHF diethyl phosphonate sodium hydroxide monohydrolysis.

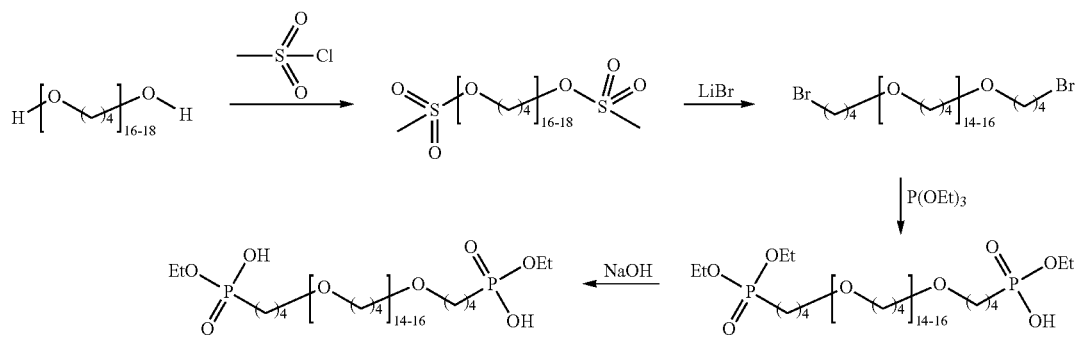

1st Step:

100 g (0.10 mol; 1 eq) of 1000 g/mol polyTHF and 33.4 g (0.33 mol; 3.3 eq) of triethylamine are dissolved in 1 l of dichloromethane, in a two-necked flask. The mixture is magnetically stirred at 0° C. under a stream of argon, and 34.4 g (0.30 mol; 3 eq) of mesyl chloride are added dropwise. At the end of the addition, the reaction medium is left to stir at ambient temperature for 4 h.

At the end of the reaction, 1 l of dichloromethane is added, and the mixture is then extracted with 300 ml of 1M hydrochloric acid in order to remove the excess mesyl chloride and triethylamine, and also the triethylammonium chloride formed during the reaction. The chlorinated phase is then washed with 300 ml of deionized water, then dried over anhydrous sodium sulfate. Finally, the dichloromethane is removed by evaporation under vacuum (50° C.; 0.1 mbar). Total removal of the dichloromethane is essential in order to avoid the setting up of a side reaction during the bromination step No. 2.

The final product is an orange viscous liquid; the synthesis yield is 97% (111.7 g).

2nd Step:

111.7 g (0.09 mol; 1 eq) of polyTHF bis-mesylate are dissolved in 560 ml of N,N-dimethylformamide, in a single-necked flask. 31.3 g (0.36 mol; 4 eq) of lithium bromide are added. The mixture is magnetically stirred at 100° C. for 12 h.

At the end of the reaction, 2 l of ethyl acetate are added and the mixture is extracted with 5×300 ml of deionized water in order to remove the excess lithium bromide and the N,N-dimethylformamide. The organic phase is subsequently dried over anhydrous sodium sulfate and then the solvents are removed by evaporation under vacuum (70° C.; 0.1 mbar).

The final product is a brown viscous liquid; the synthesis yield is 91% (98.9 g).

3rd Step:

70 g (0.058 mol; 1 eq) of dibrominated polyTHF and 96.1 g (0.58 mol; 10 eq) of triethyl phosphite are introduced into a single-necked flask. The flask is fitted with a Dean Stark apparatus, which is itself surmounted by a condenser, then the medium is magnetically stirred at 160° C. for 8 h. At the end of the reaction, the excess triethylphosphite and also the diethyl ethyl phosphonate (reaction by-product) are removed by distillation under vacuum at 160° C.

The final product is a light-yellow viscous liquid; the synthesis yield is 99.8% (77 g).

4th Step:

50 g (0.039 mol; 1 eq) of polyTHF bis-phosphonate ET are dissolved in 80 ml of ethanol, in a single-necked flask. An aqueous sodium hydroxide solution is prepared, in a beaker, by dissolving 15.4 g (0.39 mol; 10 eq) of sodium hydroxide in 20 ml of water, then the resulting solution is added to the polyTHF dissolved in ethanol. The mixture is magnetically stirred at 40° C. for 12 h. At the end of the reaction, 300 ml of water are added. The medium is re-acidified to pH 2 by adding 43 g of 37% hydrochloric acid dropwise. 1.5 l of ethyl acetate are added and the mixture is extracted with 3×200 ml of water. The organic phase is dried over anhydrous sodium sulfate, then the ethyl acetate is removed by evaporation under vacuum.

The final product is a brown wax; the synthesis yield is 74% (35.1 g).

The PolyTHF bis-phosphonic acid monoethyl ester is characterized by nuclear magnetic resonance CH NMR) spectroscopy.

$^1$H and $^{31}$P NMR analyses are carried out with a Bruker Avance 300 Spectrometer (300 MHz), $^1$H, $^{31}$P QNP probe. The samples are dissolved in deuterated chloroform ($CDCl_3$).

TABLE A

| Chemical group | Chemical shift in $^1$H NMR (in ppm) |
|---|---|
| $CH_3$—$CH_2$—O | 1.32 |
| O—$CH_2$— $CH_2$— $CH_2$— $CH_2$—O and $CH_2$P | 1.5 to 1.9 |
| O— $CH_2$— $CH_2$— $CH_2$— $CH_2$—O | 3.43 |
| $CH_3$— $CH_2$—O | 4.1 |

TABLE B

| Chemical group | Chemical shift in $^{31}$P NMR (in ppm) |
|---|---|
| $CH_3$— $CH_2$—O | 35.3 |

In summary, the characteristics of the phosphonic hemiester B are as follows:

TABLE C

| Composition | n = 13.6 |
|---|---|
| Molar mass | 1325 g/mol |
| Function index | 1.5 meq/g |
| Functionality | 2.0 |

III.2. Tests

The rubber compositions are characterized after curing, as indicated below.

III.2.a Tensile Tests

These tensile tests make it possible to determine the properties at break. Unless otherwise indicated, they are carried out in accordance with French Standard NFT 46-002 of September 1988.

The tensile strengths (in MPa) and the elongations at break (in base 100) are measured at 23° C.±2° C. and at 100° C.±2° C., according to Standard NF T 46-002.

III.2.b Preparation of the Compositions

The following tests are carried out in the following way: the epoxidized diene elastomer, the reinforcing filler, the organopolyphosphorus compound and the other additives, and also, where appropriate, imidazole are successively introduced into an internal mixer (final degree of filling: approximately 70% by volume), the initial vessel temperature of which is approximately 60° C. Thermomechanical working (non-productive phase) is then carried out in one step, which lasts in total approximately from 3 to 4 min, until a maximum "dropping" temperature of 180° C. is reached.

The mixture thus obtained is recovered and cooled, and the compositions thus obtained are subsequently calendered, either in the form of slabs (thickness from 2 to 3 mm) or of thin sheets of rubber, for the measurement of their physical or mechanical properties, or extruded in the form of a profiled element.

III.3. Compositions and Results

The compositions according to the invention have greater ease of preparation and simplicity than a conventional rubber composition (crosslinked with sulfur), while also improving the extensometry properties of these compositions compared to compositions comprising a crosslinking system based on a dicarboxylic acid as used in the prior art.

For this, rubber compositions were prepared as indicated above, some of which comply with the invention (C3, C4 and C5) and one of which does not, said non-compliant composition comprising a crosslinking system based on a dicarboxylic acid (control C1) as indicated in Tables 1a (with imidazole) and 1b (without imidazole), the amounts being expressed in parts by weight.

The properties of compositions C1 to C4 were measured as indicated above and the results are shown in Tables 2a (with imidazole) and 2b (without imidazole), and also Table 2c comparing the effect of imidazole in the compositions conforming to the invention.

TABLE 1a

| Components | C4 Dicarboxylic Acid | Bi-sphosphonic hemiester A | Bi-sphosphonic hemiester B | Di-phosphonic acid |
|---|---|---|---|---|
| SBR-functional (1) | 100 | 100 | 100 | 100 |
| Silica (2) | 45 | 45 | 45 | 45 |
| Silane 1 (3) | 4.05 | 4.05 | 4.05 | 4.05 |
| Silane 2 (4) | 0.99 | 0.99 | 0.99 | 0.99 |
| Processing aid (5) | 1 | 1 | 1 | 1 |
| 6-PPD (6) | 3 | 3 | 3 | 3 |
| DPG (7) | 4 | 4 | 4 | 4 |
| Polyacid (8) | 0.4 | 1.11 | 4.5 | 0.91 |
| Imidazole (9) | 1.19 | 1.19 | 1.19 | 1.19 |

TABLE 1b

| Components | C4 Dicarboxylic Acid | Bisphosphonic hemiester A | Bisphosphonic hemiester B | Di-phosphonic acid |
|---|---|---|---|---|
| SBR-functional (1) | 100 | 100 | 100 | 100 |
| Silica (2) | 45 | 45 | 45 | 45 |
| Silane 1 (3) | 4.05 | 4.05 | 4.05 | 4.05 |
| Silane 2 (4) | 0.99 | 0.99 | 0.99 | 0.99 |
| Processing aid (5) | 1 | 1 | 1 | 1 |
| 6-PPD (6) | 3 | 3 | 3 | 3 |
| DPG (7) | 4 | 4 | 4 | 4 |
| Polyacid (8) | 0.4 | 1.11 | 4.5 | 0.91 |

1. SBR 15.6 mol % Styrene, 12.5 mol % PB1-2; 69.8 mol % PB1-4; 2.1 mol % glycidyl units
2. Silica 160MP, Zeosil 1165MP from Rhodia
3. Dynasylan Octeo from Degussa
4. TESPT Si69 from Degussa
5. Paraffin 6266
6. N-(1,3-Dimethylbutyl)-N-phenyl-para-phenylenediamine: (Santoflex 6-PPD from Flexsys)
7. Diphenylguanidine
8. Amount of polyacid: 3.4 mmol C4 Dicarboxylic acid, succinic acid from Sigma-Aldrich, M=118.09 g/mol Bisphosphonic hemiester A M=322.34 g/mol

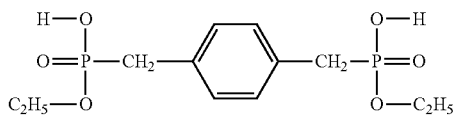

synthesized according to the procedure described in Molecules 2015, 20, 14435-14450;
doi:10.3390/molecules200814435

Long bisphosphonic hemiester B M=1325.00 g/mol synthesized above, diphosphonic acid p-Xylylenebisphosphonic acid from ABCR CAS 4546-06-09 M=266.13 g/mol 9. 1-benzyl-2-methylimidazole CAS: 13750-62-4 from Sigma-Aldrich It is noted in the compositions of the invention that the replacement of the crosslinking system based on a dicarboxylic acid with a crosslinking system based on an organopolyphosphorus compound of general formula (I) makes it possible to obtain a significant improvement in the extensometry properties at low and high temperatures. This improvement is observed with or without imidazole.

Thus, the use of a crosslinking system based on an organopolyphosphorus compound in a composition containing an epoxidized diene elastomer makes it possible to simplify the crosslinking system and gives the composition significantly improved extensometry properties compared to a composition comprising a crosslinking system based on a dicarboxylic acid.

TABLE 2a

With imidazole

| | Compositions | | | |
|---|---|---|---|---|
| | C1 | C2 | C3 | C4 |
| Crosslinking agent | dicarboxylic acid | Bisphosphonic hemiester A | Bisphosphonic hemiester B | Diphosphonic acid |
| Extensometry properties at 23° C. | | | | |
| Elongation at break (%) | 100 | 124 | 155 | 128 |
| Mean breaking stress (MPa) | 100 | 119 | 127 | 128 |
| Extensometry properties at 100° C. | | | | |
| Elongation at break (%) | 100 | 164 | 188 | 106 |
| Mean breaking stress (MPa) | 100 | 171 | 155 | 107 |

Dicarboxylic acid = succinic acid from Sigma-Aldrich
Bisphosphonic hemiester A = phosphonic acid [1,4-phenylene(methylene)]bis-P,P'-diethyl ester
Bisphosphonic hemiester B = as synthesized above
Diphosphonic acid = p-xylylenebisphosphonic acid from ABCR TABLE 2b WITHOUT imidazole

| | Compositions | | | |
|---|---|---|---|---|
| | C1 | C2 | C3 | C4 |
| Crosslinking agent | dicarboxylic acid | Bisphosphonic hemiester A | Bisphosphonic hemiester B | Diphosphonic acid |
| Extensometry properties at 23° C. | | | | |
| Elongation at break (%) | 100 | 125 | 161 | 121 |
| Mean breaking stress (MPa) | 100 | 120 | 126 | 120 |
| Extensometry properties at 100° C. | | | | |
| Elongation at break (%) | 100 | 178 | 230 | 121 |
| Mean breaking stress (MPa) | 100 | 191 | 203 | 128 |

Dicarboxylic acid = succinic acid from Sigma-Aldrich
Bisphosphonic hemiester A = phosphonic acid [1,4-phenylene(methylene)]bis-P,P'-diethyl ester
Bisphosphonic hemiester B = as synthesized above
Diphosphonic acid = p-xylylenebisphosphonic acid from ABCR TABLE 2c

| Crosslinking agent | Compositions | | | | | |
|---|---|---|---|---|---|---|
| | C2 Bisphosphonic hemiester A | | C3 Bisphosphonic hemiester B | | C4 Diphosphonic acid | |
| | With imidazole | Without imidazole | With imidazole | Without imidazole | With imidazole | Without imidazole |
| Extensometry properties at 23° | | | | | | |
| Elongation at break (%) | 100 | 126 | 100 | 130 | 100 | 118 |
| Extensometry properties at 100° | With imidazole | Without imidazole | With imidazole | Without imidazole | With imidazole | Without imidazole |
| Elongation at break (%) | 100 | 121 | 100 | 136 | 100 | 127 |

Bisphosphonic hemiester A = phosphonic acid [1,4-phenylene(methylene)]bis-P,P'-diethyl ester
Bisphosphonic hemiester B = as synthesized above
Diphosphonic acid = p-xylylenebisphosphonic acid from ABCR The surprising and unexpected nature of the improvement observed in particular in view of the absence of imidazole in the composition in accordance with the invention concerning the properties of elongation at break is also noted.

Thus, the use of a crosslinking system based on an organopolyphosphorus compound in a composition containing an epoxidized diene elastomer and which is devoid of an imidazole makes it possible to simplify the crosslinking system and gives the composition improved extensometry properties compared to a composition according to the invention which contains imidazole.

The invention claimed is:

1. A rubber composition containing at least:
   an elastomer matrix comprising at least one diene elastomer comprising epoxide functions;
   a reinforcing filler; and
   a system for crosslinking the at least one diene elastomer, the system comprising at least one organopolyphosphorus compound of general formula (I)

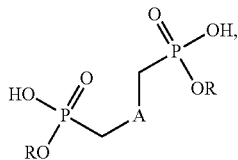

(I)

in which:
   A represents a covalent bond or a hydrocarbon group comprising at least 1 carbon atom, which is optionally substituted and which optionally comprises one or more heteroatoms, and
   each R represents, independently of one another, a hydrocarbon group comprising at least 1 carbon atom or a hydrogen atom.

2. The rubber composition according to claim 1, wherein A represents a covalent bond or a divalent hydrocarbon group comprising at least 1 and at most 1800 carbon atoms.

3. The rubber composition according to claim 1, wherein A is a divalent hydrocarbon group of aliphatic type or a divalent hydrocarbon group of aromatic type, or a divalent group comprising at least one aliphatic part and one aromatic part.

4. The rubber composition according to claim 1, wherein A comprises at least one heteroatom selected from oxygen, nitrogen and sulfur.

5. The rubber composition according to claim 1, wherein A does not comprise any other phosphonic function.

6. The rubber composition according to claim 1, wherein A is a divalent group of aliphatic type or a divalent group comprising at least one aliphatic part and one aromatic part, which group optionally comprises at least one oxygen atom.

7. The rubber composition according to claim 1, wherein each R represents, independently of one another, a hydrogen atom or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms.

8. The rubber composition according to claim 1, wherein each R is identical and represents a hydrogen atom or an alkyl group having from 1 to 12 carbon atoms.

9. The rubber composition according to claim 1, wherein a content of the at least one organopolyphosphorus compound is at least 0.2 and at most 20 phr.

10. The rubber composition according to claim 1, wherein the rubber composition is devoid of non-epoxidized diene elastomer.

11. A tire comprising the rubber composition according to claim 1.

* * * * *